US006853689B1

(12) United States Patent
Nilsson

(10) Patent No.: US 6,853,689 B1
(45) Date of Patent: Feb. 8, 2005

(54) METHOD AND APPARATUS FOR CHANNEL ESTIMATION WITH TRANSMIT DIVERSITY

(75) Inventor: Johan Nilsson, Malmö (SE)

(73) Assignee: Telefonaktiebolaget LM Ericsson, Stockholm (SE)

(*) Notice: Subject to any disclaimer, the term of this patent is extended or adjusted under 35 U.S.C. 154(b) by 0 days.

(21) Appl. No.: 09/573,157

(22) Filed: May 19, 2000

Related U.S. Application Data

(60) Provisional application No. 60/143,957, filed on Jul. 15, 1999.

(51) Int. Cl.$^7$ .............................. H04B 7/02; H04L 12/26
(52) U.S. Cl. ....................................... 375/267; 370/326
(58) Field of Search ................................. 375/267, 347, 375/349

(56) References Cited

U.S. PATENT DOCUMENTS

| 5,592,490 | A | * | 1/1997 | Barratt et al. ................ 370/310 |
| 5,727,032 | A | * | 3/1998 | Jamal et al. ................. 375/347 |
| 5,828,658 | A | * | 10/1998 | Ottersten et al. ............ 370/310 |
| 6,115,427 | A | * | 9/2000 | Calderbank et al. ........ 375/267 |
| 6,269,131 | B1 | * | 7/2001 | Gothe et al. ................ 375/346 |
| 6,317,098 | B1 | * | 11/2001 | Andrews et al. ............ 343/797 |
| 6,377,559 | B1 | * | 4/2002 | Haardt ........................ 370/326 |
| 6,470,044 | B1 | * | 10/2002 | Kowalski ..................... 375/148 |
| 6,549,585 | B2 | * | 4/2003 | Naguib et al. ............... 375/267 |

FOREIGN PATENT DOCUMENTS

| DE | 4219677 A1 | 2/1993 |
| EP | 0993129 A2 | 4/2000 |

OTHER PUBLICATIONS

3GPP–standard, see 3rd Generation Partnership Project (3GPP), 3GPP RAN 25.211 V.2.1.0, Jun. 1999, Section 5.3.2.
"Universal Mobile Telecommunications System (UMTS); Physical Channels and Mapping of Transport Channels onto Physical Channels (FDD) (3G TS 25.211 version 3.1.1 Release 1999)", ETSI TS 125 211 V3.1.1 (Jan. 2000).
Jiann–Ching Guey, et al., "Signal Design for Transmitter Diversity Wireless Communication Systems over Rayleigh Fading Channels", IEEE Transactions on Communications, vol. 47, No. 4, Apr. 1999, pp. 527–537.

* cited by examiner

Primary Examiner—Stephen Chin
Assistant Examiner—Lawrence Williams
(74) Attorney, Agent, or Firm—Burns, Doane, Swecker & Mathis, L.L.P.

(57) ABSTRACT

A method and apparatus are described for estimating channels in a radio communication system using transmit diversity. Channel coefficients $\hat{g}_{11}, \hat{g}_{12}, \hat{g}_{21}, \hat{g}_{22}$ associated with a transmit diversity channel may be estimated in a radio communication system having a Base Station (BS) and at least one Mobile Station (MS) includes a transmit diversity channel transmitted over at least two propagation paths from at least two antennas associated with a BS. A sequence of pilot symbols is provided for each of at least two antennas for transmission from the BS to a MS over the transmit diversity channel. A series of symbols $r_1$, $r_2$, $r_3$, $r_4$ are received at the MS from the transmit diversity channel and a matrix P of values of the sequence of pilot symbols is established according to a relation which satisfies a full rank condition for the matrix P which may be stored together with $P^{-1}$ in a memory. Channels estimates are determined using the matrix and the received sequence.

28 Claims, 4 Drawing Sheets

METHOD AND APPARATUS FOR CHANNEL ESTIMATION WITH TRANSMIT DIVERSITY

CROSS-REFERENCE TO RELATED APPLICATIONS

This application claims the benefit of U.S. Provisional Application No. 60/143,957, filed Jul. 15, 1999.

BACKGROUND

The present invention relates to channel estimation in a mobile receiver when transmit diversity is used. In particular, the present invention is related to channel estimation in a transmit diversity environment using pilot signals.

Transmit diversity is a technique involving transmitting data from two antennas and is used to improve fading margins. More specifically, in radiocommunication systems employing transmit diversity and corresponding diversity reception, a signal is obtained by combining signals that originate from two or more independent sources that have been modulated with identical information-bearing signals that may vary in their transmission characteristics at any given instant. Diversity transmission and reception are used to obtain reliability and signal improvement by overcoming the effects of fading, outages, and circuit failures. In radiocommunication systems using diversity transmission and reception, the amount of received signal improvement depends on the independence of the fading characteristics of the signal as well as circuit outages and failures.

Fading in a radiocommunication system may refer to the time variation of the amplitude or relative phase, or both, of one or more of frequency components of a received signal. Fading may be caused by time varying changes in the propagation path characteristics of the medium typically an air interface in the case of radiocommunication systems. Accordingly, a fading margin, may be defined as a design allowance providing for sufficient system gain or sensitivity to accommodate expected signal fading, for the purpose of ensuring that a required quality of service is maintained throughout, for example, a geographic region or service area. A fading margin may express the amount by which a received signal level may be reduced without causing system performance to fall below a specified threshold value which would compromise reception by, for example, a mobile station (MS).

Transmit diversity may be achieved, for example, with independent transmissions from two antennas. By transmitting from two antennas, associated with, for example, two Base Stations (BS), the integrity of the communication is less sensitive to disruption should signal fading occur on one or both of the propagation paths due to channel noise or other changes to the propagation path characteristics. A BS may transmit both data and control signals to an MS. It may further be common for predetermined signals, for example, pilot signals, to be transmitted from the BS to the MS.

A pilot signal is a signal, usually transmitted at a single frequency over, for example, the air interface of a radiocommunication system for supervisory, control, equalization, continuity, synchronization, or reference purposes. Because of the proliferation of frequency channel hopping systems, it may sometimes be necessary to employ several independent pilot frequencies to convey pilot related information. Pilot signals, in such systems, may include a series of predetermined symbols. Such predetermined symbols may provide known information which can be used by a receiver to perform channel estimation.

In the case of systems employing transmit diversity, different pilot signals, or pilot symbols, are transmitted on the two antennas. This makes it possible for the MS to derive individual channel estimates for signals transmitted by the two BS antennas. Channel estimates allow the receiver to characterize the manner in which the air interface is impacting the transmitted symbols by generating, for example, intersymbol interference (ISI). Accordingly, a channel estimate facilitates the recovery of information from the received signal in the event of signal fading and the like. Channel estimates using known pilot signals provide the receiver with some information about the nature of the received signal and is an example of coherent estimation while still other systems attempt to characterize the air interface without any a priori knowledge of the received signal.

To provide an opportunity for an MS to make individual channel estimates based on signals transmitted from two antennas, as in a transmit diversity scenario, different pilot symbol sequences are transmitted on the two antennas. One such pilot pattern scheme is described in the 3GPP-standard, see 3rd Generation Partnership Project (3GPP), 3GPP RAN 25.211 V2.1.0, June 1999, Section 5.3.2, the disclosure of which is incorporated herein by reference.

Channel estimation methods using transmit diversity encoded pilots have relied on grouping, for example, alternate pilot symbols to generate two sets of channel estimates. Prior art systems make the assumption that the channels over which the pilot symbols are transmitted are constant for a duration of, for example, three or more symbols. A problem arises however in that the assumption that the channel is constant for three symbols may be inaccurate. Such an assumption may be particularly problematic in a transmit diversity scenario with rapidly time-varying channels, for example, resulting from a high degree of Doppler shift coupled with, for example, a high spreading factor.

Problems may also arise generally in connection with a high spreading factor. The spreading factor associated with, for example, a DS-CDMA system refers to the length of a symbol in chips, e.g., the number of transmitted bits or symbols in a spreading sequence per information bit or symbol. A high spreading factor refers to a symbol with a long duration. It can be appreciated that symbols of a longer duration may be more susceptible to a variety of anomalies caused by time varying channel characteristics.

It would therefore be appreciated that a need exists in the art for a method and apparatus for improving channel estimation in a transmit diversity system which does not rely on a number of consecutive pilot symbols being constant in order to form a channel estimate. Such a method and apparatus would lead to reduced channel overhead and improved bandwidth for information bearing payloads and improve symbol detection.

SUMMARY

It is therefore an object of the present invention to provide a method and apparatus for determining channel estimates on a transmit diversity channel.

It is a further object of the present invention to provide such channel estimates using sequences of pilot symbols which improve the channel estimations for a time varying channel.

In accordance with one aspect of the present invention, the foregoing and other objects are achieved in a method and apparatus for estimating channel coefficients $\hat{g}_{11}, \hat{g}_{12}, \hat{g}_{21}, \hat{g}_{22}$ associated with a transmit diversity channel in a radio communication system. Such a radio communication system may have Base Station (BS) and at least one Mobile Station (MS), though the selection of pilot symbol sequences may be practiced on a BS or similar transmitter. The transmit diversity channel may be transmitted over at least two propagation paths from at least two antennas associated with the BS, or similar transmitter. The BS may provide a sequence of pilot symbols for each of the two antennas for transmission from said BS to, preferably, an MS over the transmit diversity channel. The MS may receive a series of symbols $r_1, r_2, r_3, r_4$ over, for example, the transmit diversity channel and to facilitate the channel estimate may establish a matrix P of values of said sequence of pilot symbols according to a relation $$\begin{bmatrix} \hat{g}_{11} \\ \hat{g}_{12} \\ \hat{g}_{21} \\ \hat{g}_{22} \end{bmatrix} = P^{-1} \begin{bmatrix} r_1 \\ r_2 \\ r_3 \\ r_4 \end{bmatrix},$$

where the sequence of pilot symbols may be selected such that said matrix P has full rank. Accordingly, channel coefficients $\hat{g}_{11}, \hat{g}_{12}, \hat{g}_{21}, \hat{g}_{22}$ may then be determined using said matrix P and said series of symbols $r_1, r_2, r_3, r_4$. The matrix $P^{-1}$ may further be stored in and retrieved from a memory.

The sequence of pilot symbols may include, for example, a first sequence $p_1, p_2, p_3$, and $p_4$ associated with a first one of the antennas and a second sequence $p_1, -p^*_4, -p_3$, and $p^*_2$ associated with a second one of the antennas. In order that the matrix P may have full rank the sequence may use values including, for example, $p_1=-1-j$, $p_2=-1-j$, $p_3=-1-j$, and $p_4=-1+j$. Accordingly, the matrix P may be of the form $$P = \begin{bmatrix} p_1 & 0 & p_1 & 0 \\ p_2 & 0 & -p_4^* & 0 \\ 0 & p_3 & 0 & -p_3 \\ 0 & p_4 & 0 & p_2^* \end{bmatrix}.$$

In another embodiment of the present invention, a method for estimating channel coefficients $\hat{g}_{11}, \hat{g}_{12}, \hat{g}_{21}, \hat{g}_{22}$ associated with a transmit diversity channel may be embodied in a MS. The transmit diversity channel may as above, be transmitted over at least two propagation paths from at least two antennas associated with a transmitter, such as a BS. The MS may receive a series of symbols $r_1, r_2, r_3, r_4$ from the transmit diversity channel and may establish a matrix P of values of a known sequence of pilot symbols according to a relation $$\begin{bmatrix} \hat{g}_{11} \\ \hat{g}_{12} \\ \hat{g}_{21} \\ \hat{g}_{22} \end{bmatrix} = P^{-1} \begin{bmatrix} r_1 \\ r_2 \\ r_3 \\ r_4 \end{bmatrix};$$

where the known sequence of pilot symbols are selected such that said matrix P has full rank. Accordingly channel coefficients $\hat{g}_{11}, \hat{g}_{12}, \hat{g}_{21}, \hat{g}_{22}$ for estimating the channel may be determined using the matrix P and the series of received symbols $r_1, r_2, r_3, r_4$. Matrix $P^{-1}$ may further be stored in and retrieved from a memory.

To facilitate estimation, the sequence of pilot symbols includes a first sequence $p_1, -p^*_4, -p_3,$ and $p^*_2$ associated with a second antenna. In order that the matrix P achieve full rank the sequence may further include values, for example, $p_1=-1-j$, $p_2=-1-j$, $p_3=-1-j$, and $p_4=-1+j$. The matrix P is preferably of the form $$P = \begin{bmatrix} p_1 & 0 & p_1 & 0 \\ p_2 & 0 & -p_4^* & 0 \\ 0 & p_3 & 0 & -p_3 \\ 0 & p_4 & 0 & p_2^* \end{bmatrix}.$$

BRIEF DESCRIPTION OF THE DRAWINGS

The objects and advantages of the invention will be understood by reading the following detailed description in conjunction with the drawings in which.

DETAILED DESCRIPTION

Figure 1:
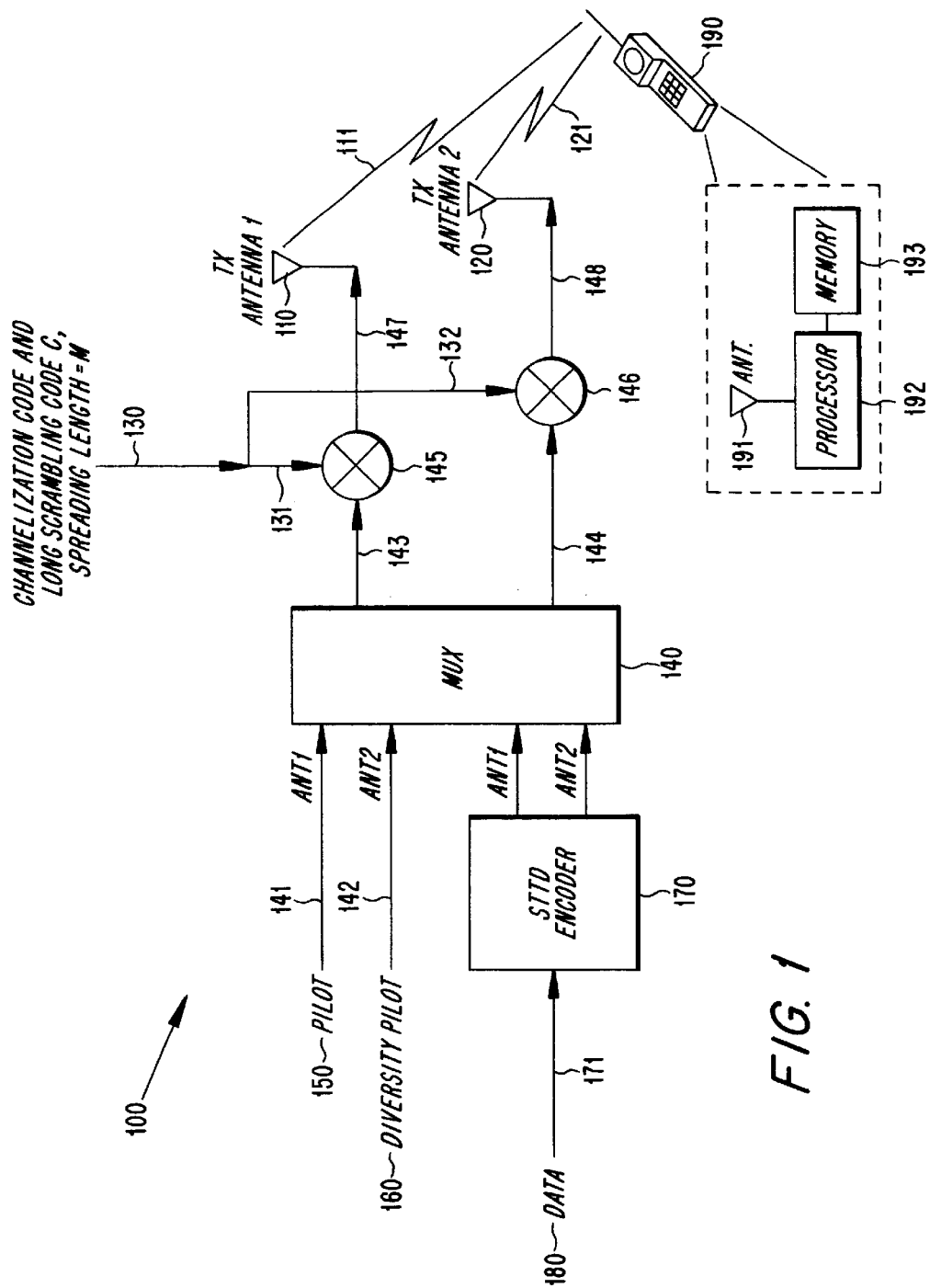
FIG. 1 is a diagram illustrating an exemplary diversity transmitter in accordance with the present invention.

The various features of the invention will now be described with respect to the figures, in which like parts are identified with the same reference characters.

In accordance with exemplary embodiments of the present invention a method and apparatus are presented for providing improved channel estimation in a receiver where signals are received in a radiocommunication system using transmit diversity. The channel estimation method and apparatus of the present invention models channels under the assumption that the channel is constant for two pilot symbols at a time in contrast to prior art methods which are based on the assumption that a channel is constant for three or more symbols. Accordingly the channel estimate is performed faster and improves the channel estimate on a time varying channel.

With reference now to FIG. 1 of the drawings, exemplary transmitter 100 is illustrated having several components including antenna 1 110 and antenna 2 120. Data 180 may be generated within transmitter 100 and may contain, for example, channel encoded data, Transmit Power Control (TPC) commands, optional Transport Format Combination Indicator (TFCI) and the like. For downlink transmit diversity systems in accordance with the present invention, Data 180 may be input to Space Time block coding based Transmit Diversity (STTD) encoder 170 on input line 171. Data 180 may further be subject to rate matching, interleaving, and the like as would be performed in non-diversity systems or modes. It may further be appreciated that STTD encoder 170 may pass encoded data to Multiplexer 140 where is can be routed appropriately to output 143 and 144 destined for transmit antennas 110 and 120, respectively. Diversity pilot signals 150 and 160 may also be input to multiplexer 140 on input lines 141 and 142 respectively to be packaged along with STTD encoded data for output on antennas 110 and 120. It may further be appreciated that channelization codes, scrambling codes and the like may be provided at inputs 130 where, via inputs 131 and 132, these codes may be combined with multiplexer 140 output signals 143 and 144 at summing junctions 145 and 146. The aggregate signal outputs 147 and 148 may be transmitted on antennas 110 and 120 to MS 190 over air interface channels 111 and 121, respectively, to achieve transmit diversity of outgoing information in accordance with the present invention. It is to be noted that MS 190 may include preferably, for example, antenna 191, processor 192, and a memory 193 as would be common in the art.

Figure 2:
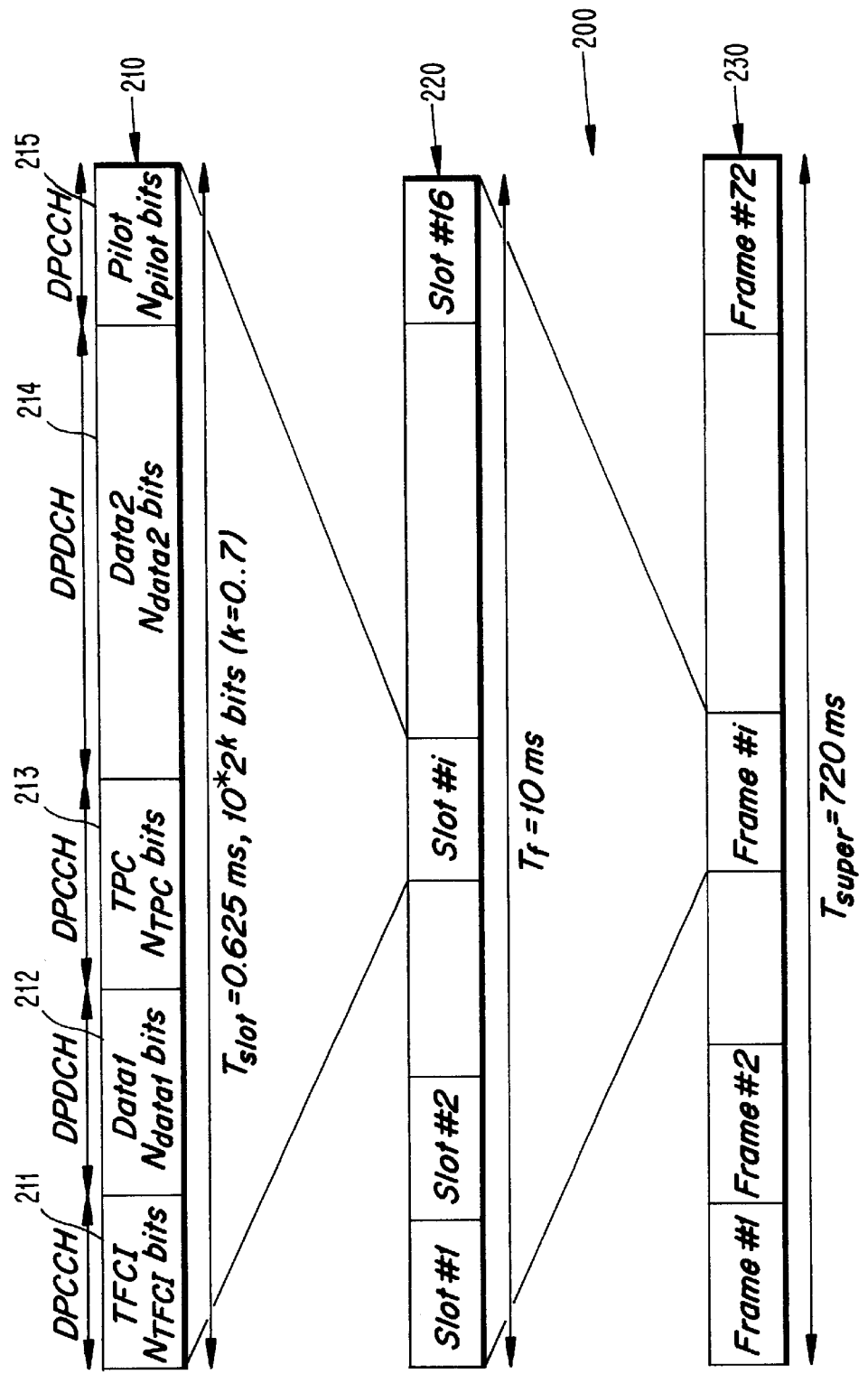
FIG. 2 is a diagram illustrating an exemplary channel format for information transmitted in accordance with the present invention by the exemplary diversity transmitter of FIG. 1.

With reference to FIG. 2 of the drawings, an exemplary data channel mapping 200 is illustrated at the level of superframe 230, frame 220 and timeslot 210. Of particular interest is timeslot format 210, in that timeslot format 210 contains, among other information, pilot signals 215 in accordance with the present invention. Additionally, timeslot format 210 may contain TFCI block 211, Data 1 block 212, TPC block 213, and Data 2 block 214. It should be noted that while transmit data represented by TFCI block 211, Data 1 block 212, TPC block 213, and Data 2 block 214 may be the same for both antennas 110 and 120 in diversity transmitter 100, pilot signals 215 may be differentiated based on which antenna is being used to transmit a particular group of signals as is described in greater detail hereinafter.

Figure 3:
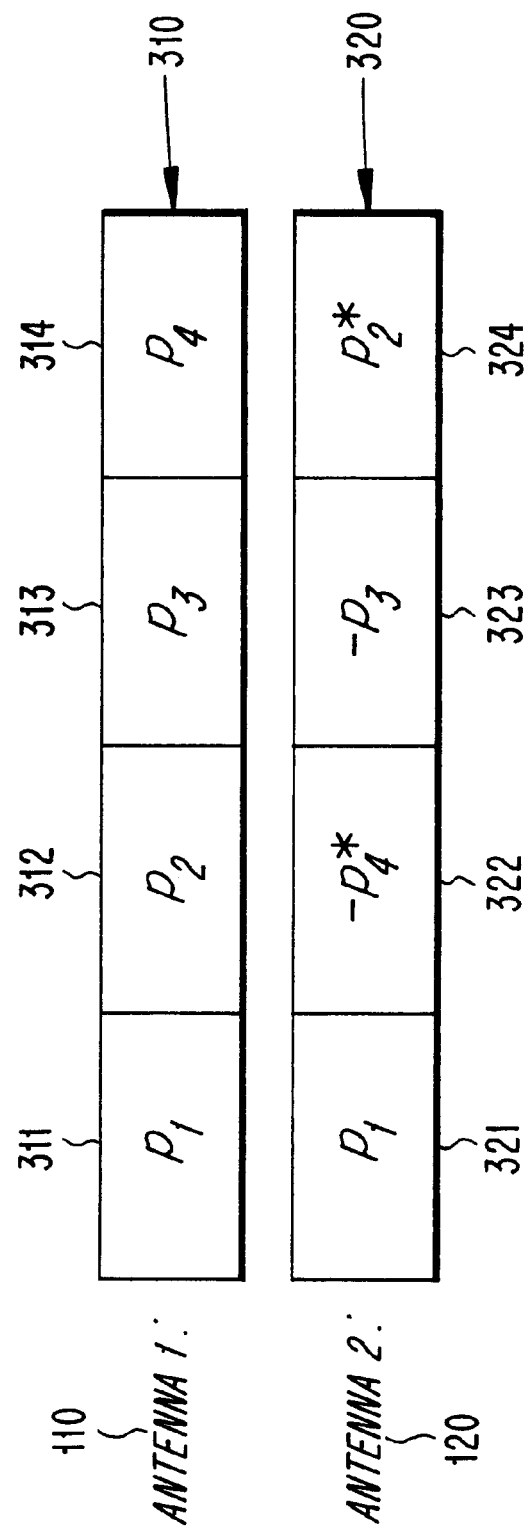
FIG. 3 is a diagram illustrating an exemplary pilot sequence transmitted by the exemplary diversity transmitter of FIG. 1 in accordance with the present invention.

With reference now to FIG. 3 of the drawings, two different pilot sequences 310 and 320, e.g., corresponding to signals transmitted on antenna 110 and antenna 120 respectively, each include four encoded pilot symbols as illustrated. At MS 190, for example, the pilot symbols will be received over air interface channels 111 and 121 as four symbols. For pilot sequence 310, pilot symbols $p_1$ 311, $p_2$ 312, $p_3$ 313, and $p_4$ 314 are included. For pilot sequence 320, pilot symbols $p_1$ 321, $-p^*_4$ 322 (the negative of the conjugate of $p_4$ 314), $-p_3$ 323, and $p^*_2$ 324 (the conjugate of $p_2$ 312) are included.

For the transmit diversity system 100, let the received symbols be $r_1$, $r_2$, $r_3$, and $r_4$. The transmission process is modeled as $$r_1 = h_{11}p_1 + h_{21}p_1 + n_1 \quad (3)$$

$$r_2 = h_{12}p_2 - h_{22}p^*_4 + n_2 \quad (4)$$

$$r_3 = h_{13}p_3 - h_{23}p_3 + n_3 \quad (5)$$

$$r_4 = h_{14}p_4 - h_{24}p^*_2 + n_4 \quad (6)$$

where $h_{ij} \in C$ are the channel coefficients, $n_j \in C$ is added noise, and $p_j \in C$ are the pilot symbols as described above. Channel coefficients, $h_{ij}$, will be different for antenna 1 110 and antenna 2 120, and will be time varying. The task for MS 190 is to estimate $h_{ij}$ by using the received symbols $r_j$. This task is otherwise known as the channel estimation problem.

Channel estimation with transmit diversity encoded pilot sequences 310 and 320 requires grouping $r_1$ and $r_3$ to obtain one set of channel estimates, and grouping $r_2$ and $r_4$ to obtain a second set of channel estimates. The structure of the pilot pattern encoding normally lends itself to such an approach. The received symbols $r_1$ and $r_3$ depend, for example, on pilot symbols $p_1$ 311 and $p_3$ 313. For the second channel estimate, $r_2$ and $r_4$ depend on, for example, pilot symbols $p_2$ 312 and $p_4$ 314. An assumption may be made that channels associated with pilot sequences 310 and 320 are constant for the duration of three symbols. Such an assumption lead to the relationship among the new channel coefficients $f_{11}$, $f_{21}$, $f_{12}$, and $f_{22}$, fulfilling:

$$f_{11} = h_{11} = h_{13} \quad (5)$$

$$f_{12} = h_{12} = h_{14} \quad (6)$$

$$f_{21} = h_{21} = h_{23} \quad (7)$$

$$f_{22} = h_{22} = h_{24} \quad (8)$$

The received signals can then be written as $$r_1 = f_{11}p_1 + f_{21}p_1 + n_1 \quad (9)$$

$$r_3 = f_{11}p_3 - f_{21}p_3 + n_3. \quad (10)$$

and a first set of channel estimates may then be formed as $$\begin{bmatrix} \hat{f}_{11} \\ \hat{f}_{21} \end{bmatrix} = P_1^{-1} \begin{bmatrix} r_1 \\ r_3 \end{bmatrix}, \quad (11)$$

where $$P_1 = \begin{bmatrix} p_1 & p_1 \\ p_3 & -p_3 \end{bmatrix}. \quad (12)$$

Since $P_1$ is a full rank matrix, for nonzero pilot symbols $p_1$ 311 and $p_3$ 313, the matrix inverse exists. Applying the same method to the second, $p_2$ 312, and fourth, $p_4$ 314, pilot symbols gives the channel estimates $$\begin{bmatrix} \hat{f}_{12} \\ \hat{f}_{22} \end{bmatrix} = P_2^{-1} \begin{bmatrix} r_2 \\ r_4 \end{bmatrix}, \quad (13)$$

where $$P_2 = \begin{bmatrix} p_2 & -p^*_4 \\ p_4 & p^*_2 \end{bmatrix}. \quad (14)$$

Again, because matrix $P_2$ is a full rank matrix, for nonzero pilot symbols, the matrix inverse exists. However, a problem arises with the described channel estimation method in that the assumption that the channel is constant for three symbols is weak in the case of a time varying channel. The three symbol assumption would be invalid, for instance, for channels with high Doppler shift and which carry information transmitted with a high spreading factor as previously described.

The solution, in accordance with the present invention, provides for modeling channels associated with antenna 1 110 and antenna 2 120 as if they may be constant for only two pilot symbols of a pilot sequence, for example, $p_1$ 311, $p_2$ 312 associated with pilot sequence 310 transmitted by antenna 1 110. Let the notation $g_{11}$ be introduced for antenna 1 110 channel coefficient, and $g_{21}$ for antenna 2 120 channel coefficient. For the last two symbols of the pilot sequence, for example $p_3$ 313, and $p_4$ 314 for antenna 1 110, the channels coefficients are $g_{12}$ for antenna 1 110, and $g_{22}$ for antenna 2 120. Such a relationship gives rise to the following assumptions:

$$g_{11} = h_{11} = h_{12} \quad (15)$$

$$g_{12} = h_{13} = h_{14} \quad (16)$$

$$g_{21} = h_{21} = h_{22} \quad (17)$$

$$g_{22} = h_{23} = h_{24} \quad (18)$$

It is important to note that in accordance with the present invention, only consecutive channel coefficients are assumed to be equal. The received symbols can then be written as $$\begin{bmatrix} r_1 \\ r_2 \\ r_3 \\ r_4 \end{bmatrix} = P \begin{bmatrix} g_{11} \\ g_{12} \\ g_{21} \\ g_{22} \end{bmatrix} + \begin{bmatrix} n_1 \\ n_2 \\ n_3 \\ n_4 \end{bmatrix}, \quad (19)$$

where $$P = \begin{bmatrix} p_1 & 0 & p_1 & 0 \\ p_2 & 0 & -p_4^* & 0 \\ 0 & p_3 & 0 & -p_3 \\ 0 & p_4 & 0 & p_2^* \end{bmatrix} \quad (20)$$

If the matrix P has full rank, a channel estimate can be derived as $$\begin{bmatrix} \hat{g}_{11} \\ \hat{g}_{12} \\ \hat{g}_{21} \\ \hat{g}_{22} \end{bmatrix} = P^{-1} \begin{bmatrix} r_1 \\ r_2 \\ r_3 \\ r_4 \end{bmatrix} \quad (21)$$

The effectiveness of the channel estimate in accordance with the present invention may rely on the rank condition of the matrix P, for example in EQ (20). However, there exist several pilot symbol sequences that fulfill the rank condition on P. An example of such a pilot sequence is $p_1=-1-j$, $p_2=-1-j$, $p_3=-1-j$, and $p_4=-1+j$. Accordingly selecting pilot sequences 310 and 320 to achieve a proper rank condition for matrix P is of importance. The channel estimation method in accordance with the present invention further gives rise to a criterion for selection of pilot patterns for individual pilot symbols of pilot sequences 310 and 320. Selecting pilot patterns in accordance with the present invention to give the matrix P full rank is also of importance.

One embodiment of the channel estimation method of the present invention may be directly implemented. The matrix inverse for such an exemplary embodiment may have the structure $$P^{-1} = \begin{bmatrix} * & * & 0 & 0 \\ 0 & 0 & * & * \\ * & * & 0 & 0 \\ 0 & 0 & * & * \end{bmatrix}, \quad (22)$$

where * indicates an element that possibly is nonzero. The matrix inverse can be precalculated and stored in a memory associated with MS 190 in a manner known in the art. The exemplary channel estimator is directly implemented as $$\begin{bmatrix} \hat{g}_{11} \\ \hat{g}_{12} \\ \hat{g}_{21} \\ \hat{g}_{22} \end{bmatrix} = P^{-1} \begin{bmatrix} r_1 \\ r_2 \\ r_3 \\ r_4 \end{bmatrix}, \quad (23)$$

where the structure of the zeros in (22) can be utilized to arrive at a more efficient implementation. It is to be noted that while exemplary embodiments are illustrated using a particular set of pilot patterns, there are similar variants of pilot patterns which may be suitable for transmit diversity encoding possessing the same properties. It is contemplated that all such patterns, without needless enumeration are in accordance with the present invention.

Figure 4:
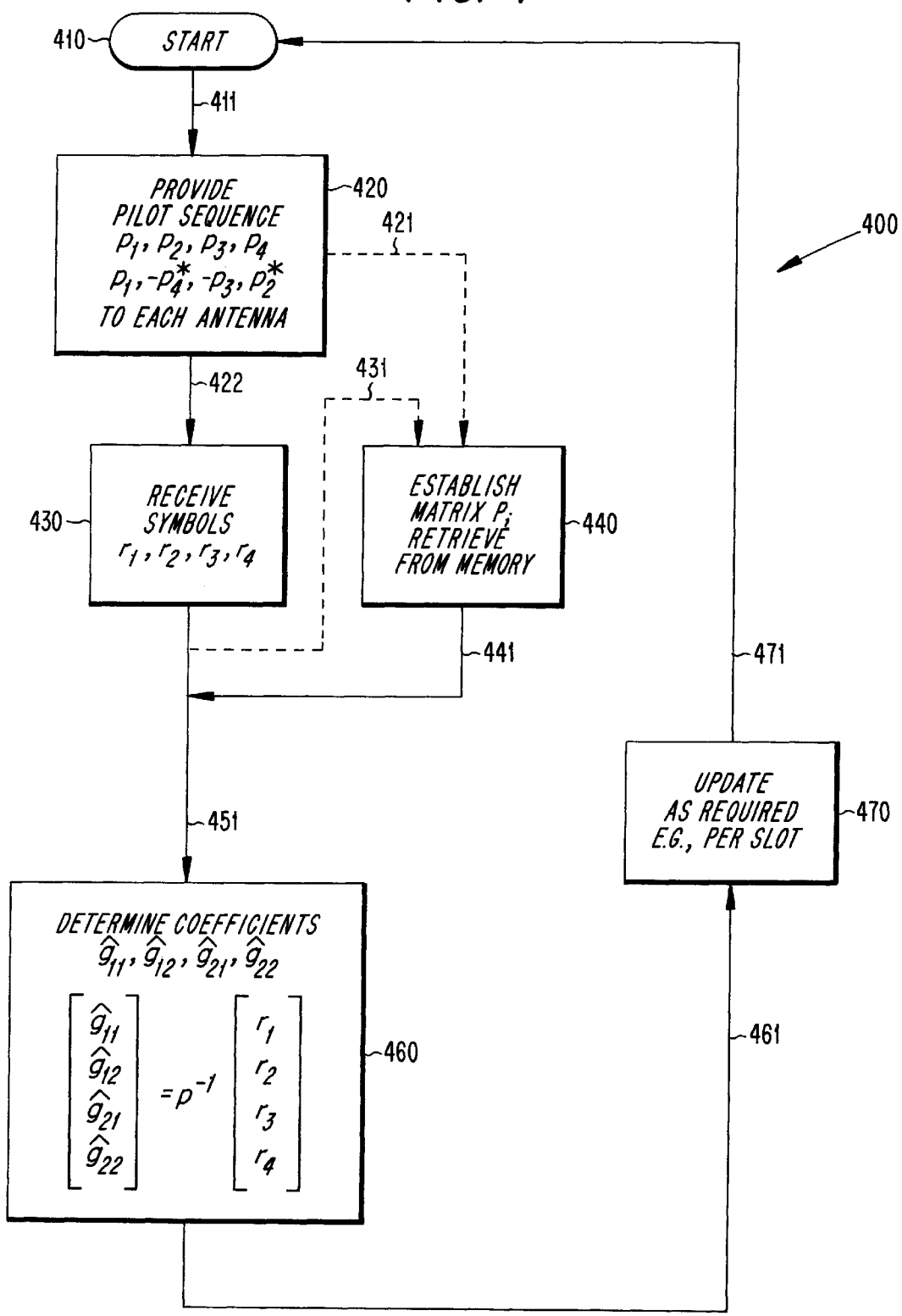
FIG. 4 is a flowchart illustrating steps in applying a method of channel estimation in accordance with an exemplary embodiment of the present invention.

A flowchart of exemplary process 400 for deriving channel estimates in accordance with the present invention is illustrated in FIG. 4. The process may begin at start block 410 where initialization and other routing formalities may be performed and proceed along arc 411 to block 420 where a pilot sequence such as pilot sequence 310 and 320 may be provided to each antenna 1 110 and antenna 2 120 of the base station transmitter respectively. Accordingly, pilot sequences 310 and 320 may be transmitted over the transmit diversity channel using antennas 110 and 120, respectively associated with, for example, a base station. A MS such as MS 190, may receive a series of symbols $r_1$, $r_2$, $r_3$, and $r_4$, which are known to be pilot symbols. At this point matrix P may be established in block 440 according to arc 421, where pilot symbols are received from block 420, and arc 431 representing received symbols from block 430. It should be noted that matrix P may be established either by constructing the matrix in real time, or preferably by retrieval from, for example, memory 193. Matrix P should preferably reflect the pilot sequences as selected in block 420. Using the received symbols $r_1, r_2, r_3$, and $r_4$ from block 430, and matrix P from block 440, channel coefficients $\hat{g}_{11}, \hat{g}_{12}, \hat{g}_{21}, \hat{g}_{22}$ may be calculated in block 460 according to the relationship of, for example, EQ (23). If necessary, process 400 may be repeated as necessary as indicated by block 470.

The invention has been described with reference to a particular embodiment. However, it will be readily apparent to those skilled in the art that it is possible to embody the invention in specific forms other than those of the preferred embodiment described above. This may be done without departing from the spirit of the invention. The preferred embodiment is merely illustrative and should not be considered restrictive in any way. The scope of the invention is given by the appended claims, rather than the preceding description, and all variations and equivalents which fall within the range of the claims are intended to be embraced therein.

What is claimed is:

1. A method for estimating channel coefficients $\hat{g}_{11}, \hat{g}_{12}, \hat{g}_{21}, \hat{g}_{22}$, associated with a transmit diversity channel in a radio communication system having a Base Station (BS) and at least one Mobile Station (MS), said transmit diversity channel being transmitted over at least two propagation paths from at least two antennas associated with said BS, said method comprising the steps of:

providing a sequence of pilot symbols for each of said at least two antennas for transmission from said BS to said MS over said transmit diversity channel;

receiving a series of symbols $r_1, r_2, r_3, r_4$ at said MS from said transmit diversity channel;

establishing a matrix of values of said sequence of pilot symbols wherein said sequence of pilot symbols is selected such that said matrix has full rank; and determining said channel coefficients $\hat{g}_{11}, \hat{g}_{12}, \hat{g}_{21}, \hat{g}_{22}$, using said matrix and said series of symbols $r_1, r_2, r_3, r_4$.

2. The method of claim 1, wherein said step of establishing further includes a step of retrieving said matrix from a memory.

3. The method of claim 1, wherein said sequence of pilot symbols further includes a first sequence $p_1$, $p_2$, $p_3$, and $p_4$ associated with a first one of said at least two antennas and a second sequence $p_1$, $-p^*_4$, $-p_3$, and $p^*_2$ associated with a second one of said at least two antennas.

4. The method of claim 3, wherein said sequence further includes $p_1=-1-j$, $p_2=-1-j$, $p_3=-1-j$, and $p_4=-1+j$.

5. The method of claim 3, wherein said matrix comprises a matrix of the form $$P = \begin{bmatrix} p_1 & 0 & p_1 & 0 \\ p_2 & 0 & -p_4^* & 0 \\ 0 & p_3 & 0 & -p_3 \\ 0 & p_4 & 0 & p_2^* \end{bmatrix}.$$

6. A method for estimating channel coefficients $\hat{g}_{11}, \hat{g}_{12}, \hat{g}_{21}, \hat{g}_{22}$, associated with a transmit diversity channel in a Mobile Station (MS), said transmit diversity channel being transmitted over at least two propagation paths from at least two antennas associated with a transmitter, said method comprising the steps of:

receiving a series of symbols $r_1, r_2, r_3, r_4$ at said MS from said transmit diversity channel;

establishing a matrix of values of a known sequence of pilot symbols wherein said known sequence of pilot symbols are selected such that said matrix has full rank; and determining said channel coefficients $\hat{g}_{11}, \hat{g}_{12}, \hat{g}_{21}, \hat{g}_{22}$, using said matrix and said series of symbols $r_1, r_2, r_3, r_4$.

7. The method of claim 6, wherein said step of establishing further includes the step of retrieving said matrix from a memory.

8. The method of claim 6, wherein said known sequence of pilot symbols further includes a first sequence $p_1, p_2, p_3$, and $p_4$ associated with a first one of said at least two antennas and a second sequence $p_1, -p^*_4, -p_3$, and $p^*_2$ associated with a second one of said at least two antennas.

9. The method of claim 8, wherein the known sequence further includes $p_1=-1-j$, $p2=-1-j$, $p_3=-1-j$, and $p_4=-1+j$.

10. The method of claim 8, wherein said matrix comprises a matrix of the form $$P = \begin{bmatrix} p_1 & 0 & p_1 & 0 \\ p_2 & 0 & -p_4^* & 0 \\ 0 & p_3 & 0 & -p_3 \\ 0 & p_4 & 0 & p_2^* \end{bmatrix}.$$

11. An apparatus for estimating channel coefficients $\hat{g}_{11}, \hat{g}_{12}, \hat{g}_{21}, \hat{g}_{22}$, associated with a transmit diversity channel in a radio communication system having Base Station (BS) and at least one Mobile Station (MS), said transmit diversity channel being transmitted over at least two propagation paths from at least two antennas associated with said BS, said apparatus comprising:

means for providing a sequence of pilot symbols for each of said at least two antennas for transmission from said BS to said MS over said transmit diversity channel;

means for receiving a series of symbols $r_1, r_2, r_3, r_4$ at said MS from said transmit diversity channel;

means for establishing a matrix of values of said sequence of pilot symbols wherein said sequence of pilot symbols is selected such that said matrix has full rank; and means for determining said channel coefficients $\hat{g}_{11}, \hat{g}_{12}, \hat{g}_{21}, \hat{g}_{22}$, using said matrix and said series of symbols $r_1, r_2, r_3, r_4$.

12. The apparatus of claim 11, wherein said means for establishing further includes storage means for storing said matrix.

13. The apparatus of claim 11, wherein said sequence of pilot symbols further includes a first sequence $p_1, p_2, p_3$, and $p_4$ associated with a first one of said at least two antennas and a second sequence $p_1, -p^*_4, -p_3$, and $p^*_2$ associated with a second one of said at least two antennas.

14. The apparatus of claim 13, wherein said sequence further includes $p_1=-1-j$, $p_2=-1-j$, $p_3=-1-j$, and $p_4=-1+j$.

15. The apparatus of claim 13, wherein said matrix comprises a matrix of the form $$P = \begin{bmatrix} p_1 & 0 & p_1 & 0 \\ p_2 & 0 & -p_4^* & 0 \\ 0 & p_3 & 0 & -p_3 \\ 0 & p_4 & 0 & p_2^* \end{bmatrix}.$$

16. An Apparatus for estimating channel coefficients $\hat{g}_{11}, \hat{g}_{12}, \hat{g}_{21}, \hat{g}_{22}$, associated with a transmit diversity channel in a Mobile Station (MS), said transmit diversity channel being transmitted over at least two propagation paths from at least two antennas associated with a transmitter, said apparatus comprising:

means for receiving a series of symbols $r_1, r_2, r_3, r_4$ at said MS from said transmit diversity channel;

means for establishing a matrix of values of a known sequence of pilot symbols wherein said known sequence of pilot symbols is selected such that said matrix has full rank; and means for determining said channel coefficients $\hat{g}_{11}, \hat{g}_{12}, \hat{g}_{21}, \hat{g}_{22}$, using said matrix and said series of symbols $r_1, r_2, r_3, r_4$.

17. The apparatus of claim 16, wherein said means for establishing further includes a storage means for storing said matrix.

18. The apparatus of claim 16, wherein said known sequence of pilot symbols further includes a first sequence $p_1, p_2, p_3$, and $p_4$ associated with a first one of said at least two antennas and a second sequence $p_1, -p^*_4, -p_3$, and $p^*_2$ associated with a second one of said at least two antennas.

19. The apparatus of claim 18, wherein said known sequence further includes $p_1=-1-j$, $p_2=-1-j$, $p_3=-1-j$, and $p_4=-1+j$.

20. The apparatus of claim 18, wherein said matrix comprises a matrix of the form $$P = \begin{bmatrix} p_1 & 0 & p_1 & 0 \\ p_2 & 0 & -p_4^* & 0 \\ 0 & p_3 & 0 & -p_3 \\ 0 & p_4 & 0 & p_2^* \end{bmatrix}.$$

21. The method of claim 1, wherein a matrix $P^{-1}$ is an inverse of the matrix of values of said sequence of pilot symbols, and wherein said channel coefficients $\hat{g}_{11}, \hat{g}_{12}, \hat{g}_{21}, \hat{g}_{22}$, are determined according to a relation $$\begin{bmatrix} \hat{g}_{11} \\ \hat{g}_{12} \\ \hat{g}_{21} \\ \hat{g}_{22} \end{bmatrix} = P^{-1} \begin{bmatrix} r_1 \\ r_2 \\ r_3 \\ r_4 \end{bmatrix}.$$

22. The method of claim 21, comprising retrieving the matrix $P^{-1}$ from a memory.

23. The method of claim 6, wherein a matrix $P^{-1}$ is an inverse of the matrix of values of said sequence of pilot symbols, and wherein said channel coefficients $\hat{g}_{11}, \hat{g}_{12}, \hat{g}_{21}, \hat{g}_{22}$, are determined according to a relation $$\begin{bmatrix} \hat{g}_{11} \\ \hat{g}_{12} \\ \hat{g}_{21} \\ \hat{g}_{22} \end{bmatrix} = P^{-1} \begin{bmatrix} r_1 \\ r_2 \\ r_3 \\ r_4 \end{bmatrix}.$$

24. The method of claim 23, comprising retrieving the matrix $P^{-1}$ from a memory.

25. The apparatus of claim 11, wherein a matrix $P^{-1}$ is an inverse of the matrix of values of said sequence of pilot symbols, and wherein said means for determining determines said channel coefficients $\hat{g}_{11}, \hat{g}_{12}, \hat{g}_{21}, \hat{g}_{22}$, according to a relation $$\begin{bmatrix} \hat{g}_{11} \\ \hat{g}_{12} \\ \hat{g}_{21} \\ \hat{g}_{22} \end{bmatrix} = P^{-1} \begin{bmatrix} r_1 \\ r_2 \\ r_3 \\ r_4 \end{bmatrix}.$$

26. The apparatus of claim 25, wherein said means for establishing includes storage means for storing said matrix $P^{-1}$.

27. The apparatus of claim 16, wherein a matrix $P^{-1}$ is an inverse of the matrix of values of said sequence of pilot symbols, and wherein said means for determining determines said channel coefficients $\hat{g}_{11}, \hat{g}_{12}, \hat{g}_{21}, \hat{g}_{22}$, according to a relation $$\begin{bmatrix} \hat{g}_{11} \\ \hat{g}_{12} \\ \hat{g}_{21} \\ \hat{g}_{22} \end{bmatrix} = P^{-1} \begin{bmatrix} r_1 \\ r_2 \\ r_3 \\ r_4 \end{bmatrix}.$$

28. The apparatus of claim 27, wherein said means for establishing includes storage means for storing said matrix $P^{-1}$.

\* \* \* \* \*